United States Patent Office 3,632,669

Patented Jan. 4, 1972

1

3,632,669

PARTICULATE POLYMERS OF CYCLIC ESTERS

Robert Dean Lundberg, Somerville, N.J., and Frank Paul Del Giudice, Charleston, W. Va., assignors to Union Carbide Corporation, New York, N.Y.

No Drawing. Filed Apr. 1, 1969, Ser. No. 812,310
Int. Cl. C08g *49/04;* C08f *29/50*
U.S. Cl. 260—874 12 Claims

ABSTRACT OF THE DISCLOSURE

Particulate linear polymers of cyclic esters which are in a discrete, free-flowing, non-agglomerative form which are readily dispersible in various acyclic hydrocarbons. Such particulate polymers are produced by subjecting a mixture comprising cyclic ester monomer, interfacial agent, catalyst, and inert organic vehicle to cyclic ester polymerization conditions.

The prior art discloses that cyclic esters such as epsilon-caprolactone can be polymerized to products having average molecular weights of upwards to 250,000, and higher, at relatively fast reaction rates using either cationic or anionic catalyst; note U.S. Pat. Nos. 3,021,309 through 3,021,317. The polymerization of such cyclic esters can be carried out either in bulk or in solution. Both of these routes, however, are plagued with disadvantages and difficulties, especially in large scale manufacturing.

Many of the relatively high molecular weight cyclic ester polymers are characterized by a high degree of crystallinity. For example, poly(epsilon-caprolactone) is a crystalline tough, horny polymer which has a melting point of approximately 60° C. Poly(epsilon-caprolactone) prepared via the bulk polymerization route is obtained as a cast solid once the reaction cools to room temperature. As such, this solid polymer may be reduced in particle size by various expediencies such as grinding, chipping, cutting, dicing, etc. Such expediencies, however, are fraught with obvious economic drawbacks. Moreover, the final product is coarse, uneven, and in relatively large particle form. The polymer so reduced is still rather unwieldly to handle, but more significantly there still remains the difficult problem of the removal of impurities from the polymer such as residual monomer, solvent, etc. Other problems are manifest since the polymer oftentimes softens and smears under such mechanical reduction techniques because of its relatively low melting point.

The solution polymerization process does not appear to offer any meaningful improvement over the bulk polymerization process since not only are many of the difficulties of the latter process encountered but there is also the added disadvantage of solvent recovery. Thus, a need exists for developing a polymerization process that would produce polymers of cyclic esters in a more tractable form.

It has been discovered quite unexpectedly, indeed, that particulate polymers of cyclic esters may be prepared by polymerizing an admixture containing cyclic ester monomer, an interfacial agent, and a cyclic ester polymerization catalyst under essentially anhydrous conditions, in the presence of an inert, relatively non-polar, organic vehicle in which the monomer(s) employed is soluble and the resulting polymer produced is essentially insoluble, and for a period of time sufficient to produce said particulate polymers.

Unlike the prior art bulk and solution processes in which the resulting cyclic ester polymers inevitably end up as a monolithic mass, the practice of the present process results in the production of cyclic ester polymers which are obtained as a dispersion of discrete particle of relatively uniform size in the polymerization reaction medium and are easily recoverable therefrom utilizing simple techniques as filtration, decantation, and the like. The economies of obtaining and handling polymer in discrete particle form in contrast to the monolithic masses obtained heretofore are obvious both with respect to the novel polymerization process as well as in the handling and utilization of the novel particulate polymer product therefrom. In addition, the practice of the present process results in excellent process control of the polymerization reaction. High solids capabilities upwards to 65 weight percent solids, and higher, in the reaction medium can be obtained utilizing the novel process. Also, the problems of heat transfer in rapid polymerization reactions are greatly reduced in the instant process. Moreover, the conversion of monomer to particulate polymer is oftentimes essentially quantitative. Recovery of unreacted monomer and inert organic vehicle from the reaction product mixture is relatively simple. The particulate polymer is obtained in discrete, free-flowing, non-agglomerative form and in highly satisfactory purity.

The interfacial agents employed in the practice of the novel process are organic polymers which have a reduced viscosity value of from about 0.05 to about 10, and higher, said interfacial agent being characterized (1) by a solvatable constituent (i) which is solvatable in inert, normally-liquid saturated, acyclic hydrocarbons, (ii) which is essentially incompatible with the particulate linear polymeric product and (iii) which has an average molecular weight up to about one million, and (2) by an anchoring constituent (i) which is non-solvatable with such inert, normally-liquid, saturated, acyclic hydrocarbons, (ii) which is compatible with said particulate linear polymers such that it is associated integrally therewith, and (iii) which has an average molecular weight of at least about 1000 and is at least 0.05 to about 10 times the average molecular weight of the solvatable constituent.

The interfacial agents, as indicated above, are organic polymers and most desirably include block and graft copolymers which become associated integrally with the particulate polymeric product primarily through the anchoring constituent of the interfacial agent. The "block or graft" copolymers, as used herein, have the structure normally implied by such term, that is, they comprise copolymers in which the constituents are present not as random monomer units but as a chain of one polymer to which is attached one or more chains of another polymer. The chains of polymer may comprise one monomer or a random arrangement of two or more monomers.

The interfacial agents may be preformed or prepared in situ (during the polymerization reaction and formation of the particulate polymer). Where the block or graft copolymeric interfacial agent is preformed and then added to the reaction medium, any catalyst normally employed in the formation of polymers of cyclic esters may be used in the novel process. Where the interfacial agent is formed in situ, it should be noted that the catalyst should be effective not only in the formation of the particulate polymer but also in the formulation of the block or graft copolymeric interfacial agent.

As indicated above, the novel process is effected in the presence of an inert organic vehicle in which the resulting particulate polymer is insoluble. Consequently, the nature of the particulate polymer which is to be produced will govern the choice of the inert organic vehicle. Since cyclic ester polymers are characterized by a plurality of ester groups, i.e., $$-\overset{\displaystyle O}{\overset{\|}{C}}O-$$

which are polar in nature, a relatively non-polar, inert, organic vehicle which is a liquid under the polymerization reaction conditions is employed in the novel process. Moreover, since the cyclic ester polymer must be essentially insoluble in the inert organic vehicle, the employment of aromatic liquids as the sole vehicle, e.g., benzene, toluene, etc. should be avoided.

Illustrative inert organic vehicles which are contemplated are the normally-liquid hydrocarbons including the acyclic and alicyclic saturated hydrocarbons such as pentane, hexane, heptane, octane, dodecane, cyclopentane, cyclohexane, cycloheptane, the alkyl-substituted cycloalkanes, decahydronaphthalene, various normally-liquid petroleum hydrocarbon fractions, various high boiling mineral oils, and the like. Mixtures of inert organic vehicles can be employed, and mixtures of the aforesaid illustrated organic vehicles with a small amount of an aromatic liquid may be tolerated.

Once having determined the nature and choice of the cyclic ester polymer and inert organic vehicle in the light of the foregoing teachings, one can select the interfacial agent having the suitable constituents thereon.

The solvatable constituent of the interfacial agent may range in size from that of a conventional surfactant up to average molecular weights of several hundreds of thousands, and more. In general, it will have an average molecular weight up to about one million. It is readily appreciated that at molecular weights well below about 1,000 relatively large proportions of solvatable constituents are required, and even then the polymeric dispersions may be somewhat coarse. Consequently, it is oftentimes desirable that the solvatable constituents have an average molecular weight of at least about 1,000, preferably from about 5,000 to about 100,000. For certain end-use applications it may be preferable to use relatively long polymeric solvatable constituents.

The nature of the solvatable constituent of the interfacial agent is governed by the nature of the inert organic vehicle. In contrast to the dispersed cyclic ester polymer, the solvatable constituent should be of a similar degree of polarity to the inert organic vehicle. This is relatively easy to determine since if, for example, a normally-liquid saturated aliphatic hydrocarbon is chosen as the organic vehicle, then the solvatable constituent can comprise a saturated aliphatic hydrocarbon chain.

The anchoring constituent of the interfacial agent most generally has an average molecular weight of at least about 1,000 and is at least about 0.05 to about 10 times the total molecular weight of the solvatable constituents. Desirably the anchoring constituent has an average molecular weight of at least about 2,500 and is at least about 0.25 to about 4 times the total molecular weight of the solvatable constituents. Also, as indicated previously, the anchoring constituent (as well as the particulate cyclic ester polymer) must be essentially insoluble in the inert organic vehicle. Most polymers, however, have only limited compatability with other polymers, and consequently, it is oftentimes preferred that the anchoring constituent be of the same material as the particulate polymer or closely related thereto. When the interfacial agent is formed in situ no apparent difficulty arises since it is then possible to utilize in the resulting interfacial agent some of the monomer being polymerized or some of the relatively low polymer formed during the course of the polymerization reaction. Under these circumstances the anchoring constituent will be of the same structure as the particulate polymer. Preferably the polymer chains of the anchoring constituent should be somewhat similar in length to those of the resulting particulate polymer.

One convenient method of forming the interfacial agent in situ during the polymerization reaction is to dissolve a polymeric material in the inert organic vehicle. This soluble polymeric material eventually becomes the solvatable component to which a small amount of the monomer(s) becomes graft or block polymerized to thus form the anchoring constituent of the interfacial agent. Preformed block or graft copolymeric interfacial agents can be prepared by conventional methods which are well-documented in the lateralure. Where the interfacial agent is added to the polymerization reaction medium and it is undesirable that further block or graft copolymerization should occur thereon, the operative conditions and catalyst may be so chosen that polymerization only of the monomer(s) takes place.

A simple test of compatibility is to dissolve in a common solvent the cyclic ester polymer of the type to be prepared during the polymerization reaction and polymer substance of the type proposed for use as the anchoring constituent of the interfacial agent, then mix the dissolved polymers in the proportions which will be present in the particulate polymeric product, and thereafter cast a film from the mixed solutions. If the film is clear, then the two polymers are compatible.

In general, the interfacial agents contemplated in the present invention have reduced viscosity values of at least about 0.05, most desirably from about 0.05 to about 10, and preferably from about 0.1 to about 3. As is well known in the art, reduced viscosity value is a measure or indication of the molecular weight of polymers. Consequently, the molecular weights of the interfacial agents and the polymers of cyclic esters will be indicated by their reduced viscosity values. The expression "reduced viscosity" is a value obtained by dividing the specific viscosity by the concentration of polymer (interfacial agent or cyclic ester polymer) in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of solvent (e.g., cyclohexanone, benzene, chloroform, toluene, or other common organic solvents) at 30° C.

Desirable polymeric interfacial agents are those composed of (i) carbon, hydrogen, and oxygen atoms, or (ii) carbon, hydrogen, oxygen, and halogen (preferably chlorine) atoms. The oxygen atoms are generally in the form of etheric oxygen (—O—) or carbonyloxy $$(-\overset{\underset{\|}{O}}{C}O-)$$

Particularly suitable polymeric interfacial agents are those which are essentially free of ethylenic, acetylenic, and benzenoid unsaturation.

Illustrative subclasses of interfacial agents include the block copolymers of $C_6$–$C_{30}$ alkyl $\alpha,\beta$-alkenoate and vinyl halide; the graft copolymers of poly($C_6$–$C_{30}$ alkyl $\alpha,\beta$-alkenoate-vinyl halide) and cyclic esters; the block copolymers of $C_6$–$C_{30}$ alkyl $\alpha,\beta$-alkenoate and vinyl alkyl ether; the graft copolymers of poly($C_6$–$C_{30}$ alkyl $\alpha,\beta$-alkenoate-vinyl alkyl ether) and cyclic ester; the block copolymers of $C_6$–$C_{30}$ alkyl $\alpha,\beta$-alkenoate and vinylidene halide; the graft copolymers of poly($C_6$–$C_{30}$ alkyl $\alpha,\beta$-alkenoate-vinylidene halide) and cyclic ester; the graft and block copolymers of poly($C_6$–$C_{30}$ alkyl $\alpha,\beta$-alkenoate) and cyclic ester; the graft and block copolymers of poly(alkenyl alkanoate) and cyclic ester; and the like. It is desirable that the interfacial agent, whether preformed or prepared in situ, contain at least about 20 weight percent of the solvatable constituent, and preferably at least about 30 weight percent of the solvatable constituent. The remainder of the interfacial agent will comprise less than 80 weight percent, preferably less than 70 weight percent, of the anchoring constituent. For example, when the interfacial agent is lauryl methacrylate/vinyl chloride copolymer, the lauryl methacrylate moiety thereof will comprise at least about 20 weight percent and upwards to 99 plus weight percent. At the extreme end of such proportion, the product is, in effect, a homopolymer of lauryl methacrylate. On the other hand, the use of poly(lauryl methacrylate) in the polymerization reaction will result in the in situ formation of a block and/or graft copolymer of poly(lauryl methacrylate) and cyclic ester being polymerized.

Specific interfacial agents include by way of examples the block copolymers of lauryl methacrylate and vinyl chloride; of vinyl stearate and vinyl chloride; of myristyl methacrylate and vinyl chloride; of stearyl methacrylate and vinyl chloride; of stearyl 2-hexenoate and vinyl fluoride; of octyl acrylate and vinyl ethyl ether; of lauryl methacrylate and vinyl ethyl ether; of stearyl methacrylate and vinyl ethyl ether; of pentacosyl methacrylate and vinyl isopropyl ether; of dodecyl crotonate and vinylidene chloride; of myristyl methacrylate and vinylidene chloride; of stearyl methacrylate and vinylidene chloride; of lauryl methacrylate and vinylidene fluoride; of poly(vinyl stearate) and poly(epsilon-caprolactone); of poly(lauryl methacrylate) and poly(epsilon-caprolactone); of poly stearyl methacrylate) and poly, eta-caprylolactone); and the like.

Additional specific interfacial agents can be exemplified by the graft copolymers of poly(lauryl methacrylate-vinyl chloride) and epsilon-caprolactone, of poly(myristyl methacrylate-vinyl chloride) and delta-valerolactone, of poly(stearyl methacrylate-vinyl chloride) and zeta-enantholactone, of poly(stearyl 2-hexenoate-vinyl fluoride) and eta-caprylolactone, of poly(octyl acrylate-vinyl ethyl ether) and $\alpha,\alpha$-dimethyl-$\beta$-propiolactone, of poly(lauryl methacrylate-vinyl ethyl ether) and methyl-epsilon-caprolactone, of poly(stearyl methacrylate-vinyl ethyl ether) and dimethyl-epsilon-caprolactone, of poly(pentacosyl methacrylate-vinyl isopropyl ether) and methyl-delta-valerolactone, of poly(dodecyl crotonate-vinylidene chloride) and epsilon-caprolactone, of poly(myristyl methacrylate-vinylidene chloride) and epsilon-caprolactone, of poly(stearyl methacrylate-vinylidene chloride) and 2-keto-1,4-dioxane, of poly(lauryl methacrylate-vinylidene fluoride) and 2-keto-1,4-dioxane, of poly(vinyl stearate) and epsilon-caprolactone, of poly(nonyl methacrylate) and epsilon-caprolactone, of poly(myristyl methacrylate) and epsilon-caprolactone, of poly(lauryl methacrylate) and epsilon-caprolactone, of poly(stearyl methacrylate) and epsilon-caprolactone, of poly(vinyl ethyl ether) and epsilon-caprolactone.

The cyclic esters which are contemplated as monomeric reactants in the practice of the novel process are those which are free of ethylenic and acetylenic unsaturation. These cyclic esters are characterized in that they contain at least four atoms (and upwards to 18 atoms), at least three of which are carbon atoms, in the ring nucleus which possesses the ester groups, i.e., $$-\overset{\overset{\large O}{\|}}{C}O-$$

and especially those in which the ring nucleus is composed of carbon and oxygen, said oxygen being present in the form of the ester group, $$-\overset{\overset{\large O}{\|}}{C}O-$$

with/without etheric oxygen, i.e., —O—, also being present in said nucleus. The cyclic ester monomers are further characterized in that they contain no more than four substituents or groups bonded to the carbon atoms of the ring nucleus which contains the ester group. In a preferred aspect, these cyclic ester monomers are characterized in that (a) they possess a ring nucleus composed of carbon atoms and the ester group, (b) they contain no more than 3 substituents bonded to the carbon atoms of said nucleus, and (c) the ring carbon atom which is alpha, i.e., adjacent to the oxygen atom of the ester group (the omega carbon atom in the cyclic ester nucleus) contains no more than one substituent on said carbon atom. The cyclic ester monomers which are composed of (1) carbon, hydrogen, and oxygen atoms, represent a further preferred class. In this respect, the oxygen is present in the form of the ester group, $$-\overset{\overset{\large O}{\|}}{C}O-$$

and/or etheric oxygen (—O—). Cyclic esters which contain five atoms in the ring nucleus are not contemplated as reactant in the novel process. Beta-propiolactone is not a suitable monomer since polymers thereof exhibit thermal instability at elevated temperatures.

Suitable monomeric cyclic esters which can be employed in the novel process are best illustrated by the following formula:

I

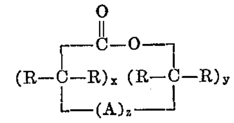

wherein each R, individually, can be hydrogen, alkyl, aryl, cycloalkyl, halo, haloalkyl, alkoxyalkyl, alkoxy, aryloxy, and the like; wherein A can be an oxy (—O—) group, a thio (—S—) group, a divalent saturated aliphatic hydrocarbon group, and the like; wherein $x$ is an integer from 1 to 15, inclusive; wherein $y$ is an integer from 1 to 15, inclusive; wherein $z$ is an integer having a value of zero or one; with the provisos that (a) the sum of $x+y+z$ cannot equal 3, (b) the total number of atoms forming the cyclic ester ring does not exceed 18, preferably does not exceed 9, (c) the total number of substituents other than hydrogen (such as those described for the R variables) attached to the carbon atoms contained in the cyclic ester ring does not execed 4, preferably does not exceed 3, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variables attached to any two adjacent carbon atoms contained in the cyclic ester ring can represent a portion of a fused aromatic hydrocarbon nucleus.

With reference to the Formula I above, illustrative R radicals include, among others, methyl, ethyl, n-propyl, isopropyl, n-butyl, sec-butyl, t-butyl, hexyl, octyl, octadecyl, phenyl, benzyl, tolyl, xylyl, ethylphenyl, phenethyl, cyclopentyl, 2-propylcyclohexyl, cyclohexyl, cycloheptyl, chloromethyl, chloroethyl, bromopropyl, chloro, fluoro, bromo, iodo, methoxymethyl, ethoxyethyl, propoxymethyl, butoxypropyl, methoxy, ethoxy, n-butoxy, n-hexoxy, 2-ethylhexoxy, dodecoxy, octadecoxy, phenoxy, ethylphenoxy, and the like. It is preferred that each R, individually, be hydrogen, alkyl, and/or alkoxy, and preferably still that each R, individually, be hydrogen, lower alkyl, e.g., methyl, ethyl, n-propyl, isobutyl and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

Representative monomeric cyclic esters which can be employed in this preferred embodiment include, for example, delta-valerolactone, epsilon-caprolactone, zeta-enantholactone, eta - caprylolactone, 12 - hydroxydodecanoic acid lactone, 14-hydroxytetradecanoic acid lactone, 16-hydroxyhexadecanoic acid lactone, alpha, alpha-di(chloromethyl)-beta-propiolactone; the alpha, alpha-dialkyl-beta-propiolactones, e.g., alpha, alpha-dimethyl-beta-propiolactone, alpha, alpha-diethyl-beta-propiolactone, and the like; the monoalkyl-delta-valerolactones, e.g., the monomethyl-, monoethyl-, monohexyl-, and monododecyl-delta- valerolactones, and the like; the dialkyl-delta-valerolactones, e.g., the dimethyl-, diethyl-, and di-n-octyl-delta-valerolactones, and the like; the monoalkyl-dialkyl-, or trialkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactone, e.g., monomethoxy-, monoisopropoxy-, dimethoxy-, and diethoxy-, delta-valerolactones and epsilon-caprolactones, and the like. Further illustrative cyclic esters include 3-bromo-2,3,4,5-tetrahydrobenzoxepin-2-one, 2-(2'-hydroxyphenyl)benzene carboxylic acid lactone, 2,5,6,7-tetrahydrobenzoxepin-2-one, 9-oxabicyclo[5.2.2]undecan-8-one, 4-oxa-14-hydroxytetradecanoic acid lactone, alpha, alpha-bis-(chloromethyl)-beta-propiolactone, 1,4 - dioxane-2-one, 3-n-propyl-2-ketone-1,4-dioxane, and the like. Illustrative subclasses of cyclic esters which are eminently suitable in this preferred embodiment include, for example, the unsubstituted lactones and the oxalactones which contain four and from six to eight atoms in the lactone ring, preferably delta-valerolactones, epsilon-caprolactone, the keto-dioxanes, and the like; the mono- and polyalkyl-substituted lactones and oxalactones which contain four and from six to eight atoms in the lactone ring, preferably the mono- and poly-lower alkoxy-delta-valerolactones, epsilon-caprolactones, and their corresponding oxalactones wherein the alkoxy substituents(s) contains from 1 to 6 carbon atoms.

A single cyclic ester monomer or mixtures of such monomers may be employed. In addition, an admixture containing cyclic ester monomer and cyclic carbonate monomer can be utilized in the novel process. Illustrative cyclic carbonates include trimethylene carbonate, 4,4-dimethyl-2,6-dioxacyclohexanone, 4,4-dichloro-2,6-dioxacyclohexanone, triethylene glycol carbonate, and the like.

The novel polymerization process can be effected in the presence of any catalyst suitable in polymerizing cyclic esters to relatively high molecular weight polymers as documented, for example, in U.S. Pats. Nos. 3,021,309 to 3,021,317, and other patents. By way of illustrations various catalysts which can be employed include dialkylzinc, alkylzinc halide, dialkylmagnesium, dialkylcadmium, trialkylaluminum, dialkylaluminum alkoxide, alkylaluminum, dialkoxide, dialkylaluminum halide, aluminum trialkoxide, alkyllithium, aryllithium, the Group II metal amide-alcoholates having the formula $H_2N—M—OR$ wherein M represents the Group II metal and R represents alkyl, etc., as exemplified by diethylzinc, di-n-propylzinc, di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, isobutylaluminum diisobutoxide, diisobutylaluminum chloride, aluminum triisopropoxide aluminum trietoxide, ethyllithium, n-butyllithium, phenyllithium, calcium amide butylate, and the like.

The cyclic ester catalysts are employed in catalytically significant quantities. In general, the particular catalyst employed, the nature of the monomeric reactants, the operative conditions under which the polymerization reaction is conducted, and other factors, will largely determine the optimum catalyst concentration. A catalyst concentration of from about 0.001 weight percent, and lower, to about 5 weight percent, and higher, based on the monomer present in the reaction medium, is suitable. A catalyst concentration of from about 0.01 to about 2 weight percent is preferred.

The concentration of the interfacial agent can vary from about 0.01 weight percent, and lower, to about 10 weight percent, and higher, based on the total weight of the monomer(s). A practical concentration is from about 0.1 to about 5 weight percent of interfacial agent.

The polymerization reaction can be conducted over a wide temperature range such as from about 0° C. to about 225° C. A more suitable temperature range is from about 20° C. to about 175° C. The optimum temperature to employ may, of course, be significantly influenced by the stability of the resulting polymeric product and the boiling point of the inert organic vehicle.

The novel process is conducted for a period of time sufficient to produce the particulate polymeric product. In general, the reaction time will vary depending upon the operative temperature, the nature of the monomeric reactant(s), interfacial agent, and catalyst employed, the choice of the inert organic vehicle, and other factors. The reaction time can vary from several minutes to several hours, e.g., up to 24 hours, and more, depending on the variables illustrated above. Most desirably, the operative conditions are adjusted so as to achieve a practical and commercially acceptable reaction rate.

The polymerization reaction preferably is effected in the liquid phase in an essentially non-aqueous reaction medium. It is desirable also to effect the polymerization reaction under an inert atmosphere, e.g., nitrogen. Pressure does not appear to be a critical factor. The reaction should be conducted in the absence of organic compounds which contain active hydrogen substituents such as carboxyl, hydroxyl, and amino.

When polymerizing an admixture containing at least two monomers, e.g., two different cyclic esters, the monomers can vary over the entire range. For example, the concentration of each monomer can be in the range of from about one to about 99 mole percent, based on the total monomers present in the reaction medium. A preferred range is from about 10 to about 90 mole percent. Admixtures containing epsilon-caprolactone and/or 2-ketone-1,4-dioxane plus mono- and/or polyalkyl substituted epsilon-caprolactone are highly preferred as starting material.

The amount of inert organic vehicle employed in the novel process can vary over a wide range. Practical and economic considerations, however, will dictate the quantity of vehicle that is utilized. The particulate cyclic ester polymeric product can comprise from less than five weight percent solids to more than 65 weight percent in the reaction product mixture. At the lower end of this range one has a very fluid mixture whereas at the higher end of this range the mixture becomes extremely viscous.

One can employ conventional equipment and material generally used in this polymer art. The order of the addition of monomer, interfacial agent, inert organic vehicle, and catalyst to the reaction zone does not appear to be critical. The polymerization reaction is most desirably carried out by agitating the reaction medium such as by stirring.

Unreacted monomeric reactant can be recovered from the reaction product mixture by conventional techniques such as heating said mixture under reduced pressure.

The particulate polymers of cyclic esters obtained by the practice of the novel process are a useful class of polymeric compounds. Such polymers can be recovered from the reaction product mixture merely by filtration or decantation, followed by drying under reduced pressure and mild temperatures, e.g., about 50° C. The particulate polymer then can be packaged in drums or other containers and shipped to the processor or customer without further treatment. These particulate polymers when incorporated as binders into "green" linoleum impart numerous desirable characteristics to the eventually compounded linoleum. The polymers, in addition, can be employed as adhesives for vinyl resin sheets, e.g., poly(vinyl chloride), and the resulting bonded sheets of vinyl resins exhibit excellent Izod impact values oftentimes exceeding that of the vinyl resin sheets bonded by heat and pressure alone. As plasticizers, the novel polymers impart excellent properties and characteristics to vinyl chloride resins. The incorporation of the novel polymers into such vinyl chloride resins results in a plasticized composition which exhibits excellent flexibility at temperatures below 0° C. and excellent low brittle temperatures. In addition, the plasticized compositions exhibit low volatility and high resistance to oil and water extraction. Moreover, films prepared from the vinyl resins which are plasticized with the novel polymers are oftentimes tougher and more extensible than films prepared from the same vinyl resins which are plasticized with conventional plasticizers, e.g., dioctyl phthalate.

In a preferred aspect, the invention contemplates the preparation of novel linear polymers of cyclic esters which are obtained in discrete, free-flowing, non-agglomerative particle form. These particulate polymers are characterized in that the average particle size can range from less than one micron, e.g., as low as 0.05 micron, to several hundred microns, e.g., upwards to about 2,000 microns, and higher. For various end-use applications it is preferred that the average particle size of these particulate polymers be from about 0.2 to about 500 microns, and most preferably from about 0.5 to about 100 microns. These particulate polymers oftentimes do not agglomerate over long periods of time, e.g., several weeks. The novel particulate polymers also exhibit the characteristic of being readily dispersible in inert normally-liquid saturated acyclic hydrocarbons such as heptane, and oftentimes such dispersions remain stable for long periods of time, e.g., upwards to one month, and longer.

Desirable novel particulate polymers are those which possess an average reduced viscosity value of at least about 0.3 and upwards to about 20, and higher. The preferred particulate polymers have an average reduced viscosity value of from about 0.5 to about 15. The novel polymers are characterized by the following recurring structural unit

II

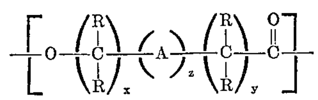

wherein each R, individually, is hydrogen, alkyl, aryl, cycloalkyl, halo, haloalkyl, alkoxyalkyl, alkoxy, or aryloxy; wherein A is an oxy group, a thio group, or a divalent saturated aliphatic hydrocarbon group; wherein $x$ is an integer from 1 to 15; wherein $y$ is an integer from 1 to 15; wherein $z$ is an integer of zero or one; with the provisos that (a) the sum of $x+y+z$ cannot equal 3, (b) the total number of atoms in the polymer chain of the above-said recurring unit does not exceed 18, preferably does not exceed 9, (c) the total number of R variables which are substituents other than hydrogen does not exceed 4, preferably does not exceed 3, (d) from 2 to 4 continuously linked carbon atoms which form part of the polymer chain of the above-said recurring unit can represent a portion of a saturated cycloaliphatic hydrocarbon nucleus, and (3) any four R variables attached to any two adjacent carbon atoms in the polymer chain of the above-said recurring unit can represent a portion of a fused aromatic hydrocarbon nucleus. The aforedescribed recurring linear units are interconnected through the oxy group (—O—) of one unit with the carbonyl group $$(-\overset{\displaystyle O}{\overset{\|}{C}}-)$$

of a second unit. In different language, the interconnection of these units does not involve the direct bonding of two carbonyl groups, i.e., $$-\overset{\displaystyle O}{\overset{\|}{C}}-\overset{\displaystyle O}{\overset{\|}{C}}$$

Moreover, since the novel particulate polymers are relatively high molecular weight products, the end groups are not determinable as macromolecules are involved. Infra-red analysis fails to disclose the terminal moieties of such relatively high molecular weight polymeric molecules which fact is readily understandable to high polymer chemists. When a comonomer such as a cyclic carbonate, e.g., trimethylene carbonate, is employed in the novel process, the resulting polymeric product will, of course, contain linear carbonate units in the polymeric chain thereof, e.g., $$-ORO\overset{\displaystyle O}{\overset{\|}{C}}-$$

wherein R is alkylene such as trimethylene. Such carbonate units characterized by an oxy group (—O—) at one end and an oxycarbonyl group $$(-O\overset{\displaystyle O}{\overset{\|}{C}}-)$$

at the other end, and these linear carbonate units will interconnect with another linear unit such as the linear lactone (or cyclic ester) units of Formula II above in the manner described previously. That is to say, the oxy group of one linear unit will interconnect with the carbonyl group of a second unit.

The novel particulate polymers, as intimated previously, are associated integrally with the interfacial agent primarily through the anchoring constituent thereof. As little as about 0.01 weight percent, and lower, and upwards to about 10 weight percent, and higher, of the interfacial agent, based on the weight of the particulate polymer, can be associated integrally with the particulate polymer. More suitably, from about 0.1 to about 5 weight percent of interfacial agent can be contained in the particulate polymer. Such interfacial agents are characterized (1) by a solvatable constituent (i) which is solvatable in inert, normally liquid, saturated, acyclic hydrocarbons, heptane, isooctane, etc., (ii) which is essentially incompatible with said particulate linear polymers, and (iii) which has an average molecular weight up to about one million, desirably at least about 1,000, e.g., from about 5,000 to about 100,000, and (2) by an anchoring constituent (i) which is non-solvatable with such inert, normally-liquid, saturated acyclic hydrocarbons, (ii) which is compatible with said particulate linear polymers such that it is associated integrally therewith, and (iii) which has an average molecular weight of at least about 1000, preferably at least about 2500, and is at least about 0.05 to about 10 times, preferably at least about 0.25 to about 4 times, the total molecular weight of the solvatable constituent. The solvatable constituent is relatively non-polar, its polarity being similar to that of the normally-liquid acyclic hydrocarbon. Since the particulate polymer is also insoluble in such normally-liquid hydrocarbons, the polarities of the solvatable constituent and particulate polymer will be significantly different. On the other hand, the anchoring constituent is a relatively polar group, its polarity being similar to that the particulate polymer. Moreover, since the anchoring constituent is non-solvatable with the normally-liquid hydrocarbon, the polarities of the anchoring constituent and the normally-liquid hydrocarbon will be quite dissimilar.

Particularly preferred novel particulate polymers are those which are characterized by the oxypentamethylenecarbonyl chain as seen in recurring structural unit

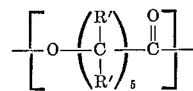

wherein each R′ is hydrogen or lower alkyl, preferably hydrogen or methyl, with the proviso that no more than 3R′ variables are substituents other than hydrogen.

In the illustrative examples the chemical designation of various materials employed are as follows:

Siponate DS–10—An anionic surfactant, i.e., dodecyl benzene sodium sulfonate.

Tergitol NPX (10 percent solution)—An anionic surfactant, i.e., hydroxypolyethylene nonylphenyl ether prepared by reacting 10.5 moles of ethylene oxide with one mole of nonylphenol.

Lupersol No. 11 (75 percent solution)—t-Butyl peroxy pivalate in mineral spirits.

In addition, the polymeric material which will function as the interfacial agent, whether preformed or to be prepared in situ, is referred to as the interfacial agent.

All reduced viscosity values referred to herein were measured at a concentration of 0.2 gm./100 ml. of solvent at 30° C.

EXAMPLE 1

To a pressure bottle the following materials were charged:

Vinyl chloride—52.5 gms.
Lauryl methacrylate—17.5 gms.
$H_2O$ (distilled)—126.2 gms.

Siponate DS-10 (98 percent)—1.7 gms.
Tergitol NPX (10 percent solution—4.2 gms.
t-Dodecyl mercaptan (96 percent)—0.43 ml.
Lupersol No. 11 (75 percent)—1.09 ml.

This mixture was heated and maintained at 45° C. for 14.1 hours. Thereafter the reaction product mixture was cooled to room temperature and methanol added thereto. The supernatant liquid was decanted and the resulting dispersion of lauryl methacrylate/vinyl chloride copolymeric product was washed twice in water. The copolymeric product was then dried in air at 55° C. There was obtained 58.0 grams of copolymer which represented an 82.6 percent yield. The product contained 39.3 percent chloride (representing 69.2 percent polymerized vinyl chloride therein). The reduced viscosity of the vinyl chloride/lauryl methacrylate copolymer was 0.58 in cyclohexanone.

EXAMPLE 2

To a pressure bottle the following materials were charged:

Vinyl chloride—53 gms.
Lauryl methacrylate—18 gms.
$H_2O$ (distilled)—126 gms.
Siponate DS-10—1.7 gms.
Tergitol NPX—4.2 gms.
t-Dodecyl mercaptan—0.43 ml.
Lupersol No. 11—1.1 ml.

The sealed bottle was placed in a tumbler at 45° C. for a period of 13 hours. The resulting reaction product was then filtered and the retained solid washed with methanol. The solids were then osterized in methanol, filtered, and dried in air at 55° C. There was obtained 167.5 grams of vinyl chloride/lauryl methacrylate copolymeric product which had a reduced viscosity of 0.42 in cyclohexanone. This copolymer product contained 33.4 percent chloride, which represented a vinyl chloride content of 58.9 percent, the remainder being lauryl methacrylate. The yield was 59.8 percent.

EXAMPLE 3

To a reaction flask, there were charged 50 grams of lauryl methacrylate, 50 grams of acetone, and 0.78 cc. Lupersol No. 11. The reaction flask was purged with nitrogen and then capped. The flask was placed in a tumbler maintained at 50° C. for a period of 31 hours. The resulting reaction product mixture was cooled to room temperature and the poly(lauryl methacrylate) product was precipitated with methanol. This product was then washed with methanol and dried in air. There was obtained 47 grams of poly(lauryl methacrylate) which was characterized as clear and tacky. The reduced viscosity of this polymeric product was 0.24 in cyclohexanone. The yield was 94 percent.

EXAMPLE 4

To a round bottom 3-neck flask there were added 100 grams of heptane, 100 grams of epsilon-caprolactone, 5 grams of the lauryl methacrylate/vinyl chloride copolymeric interfacial agent prepared in Example 2 above, and 0.08 gram of dibutylzinc. The flask was fitted with stirrer and reflux condenser. The resulting mixture was heated to 90°–95° C. while stirring. The reaction was carried out at this temperature for about 3 hours and then cooled to room temperature. There was obtained a fine dispersion of white epsilon-caprolactone polymeric product in the reaction product mixture which was recovered by filtration and vacuum dried at room temperature. This product was a fine free-flowing powder. The yield was 97.3 grams. The reduced viscosity in benzene was 1.06. The particle size of the particulate product, determined by microphotography, ranged from the maximum resolving power of the microscope (colloidal size) to about 50 microns, the average being about 30 microns.

EXAMPLE 5

To a 3-neck flask there was charged 100 grams of heptane, 100 grams of epsilon-caprolactone, 0.08 gram of dibutyl zinc, and 5.0 grams of the poly(lauryl methacrylate) interfacial agent prepared in Example 3 above. The flask was fitted with stirrer and reflux condenser. The charge was heated and maintained at 90°–95° C. for 2 hours while stirring. There was obtained a dispersion of epsilon-caprolactone polymer in the resulting reaction product mixture. A small aliquot of this polymeric dispersion was set aside for size measurement and stability observation. The remainder was filtered and dried in vacuo at room temperature. The yield of the $\epsilon$-caprolactone polymeric product was 94.8 percent and the reduced viscosity, measured in benzene at 30° C., was 0.90.

The particle size of the dispersed polymer was relatively uniform and averaged about one micron. The dispersion itself was rather stable. The dispersed particles did not settle upon standing for several days. The dispersion behaved more like an organic latex, i.e., articles dipped into the dispersion and air dried were evenly coated with polycaprolactone as a paint. A thin film of polycaprolactone could be formed by brushing the dispersion on a surface and air drying.

EXAMPLES 6–10

In Examples 6–10 the general procedure employed was as follows: Epsilon-caprolactone, poly(vinyl stearate) (reduced viscosity of 0.15 in toluene), and heptane were charged to a reaction vessel and the resulting mixture heated to about 90° C. Upon addition of the catalyst, the contents exothermed to about 100° C. maximum. After a period of 2 hours at 90–100° C., the reaction flask was cooled to room temperature, the product recovered via filtration, and washed with heptane. The yield in each instance was at least 95 percent. The pertinent data are disclosed in Table I below.

TABLE I

| | Example | | | | |
|---|---|---|---|---|---|
| | 6 | 7 | 8 | 9 | 10 |
| Caprolactone, gms | 360 | 360 | 540 | 540 | 480 |
| Poly (vinyl stearate), wt. percent [a] | 1.5 | 1.5 | 5 | 5 | 3 |
| Catalyst, wt. percent [b] | 0.3 | 0.3 | 0.3 | 0.3 | 0.2 |
| Heptane, gms | 840 | 840 | 660 | 660 | 720 |
| IR product [c] | 1.69 | 1.61 | 1.68 | 1.68 | 1.45 |
| Bulk density, product | .617 | .644 | 696 | .696 | .676 |
| Dispersion, wt. percent | 45 | 30 | 45 | 45 | 40 |
| Visual appearance of dispersion | (d) | (d) | (d) | (d) | (e) |
| Particle size of product [f] | 85.4 | 88.9 | 57.2 | 52.3 | 91.3 |

[a] Based on the weight of caprolactone.
[b] Triisobutylaluminum; weight percent based on $\mu$-caprolactone.
[c] Measured in benzene.
[d] Very good.
[e] Stable.
[f] Between 44$\mu$ and 250$\mu$, U.S. Standard Sieves.

EXAMPLES 11–14

In Examples 11–14 below, the general procedure employed was as follows:

To a reaction vessel, there were charged 50 grams of epsilon-caprolactone and 1.5 grams of interfacial agent. The reaction vessel was purged with nitrogen, sealed, and agitated for 1 hour at 85° C. to effect solution. The reaction vessel was removed, unsealed, and 50 grams of heptane was added thereto. The vessel was then purged with nitrogen, sealed, and agitated for 30 minutes at 60° C. Once again, the vessel was unsealed and 1.19 mls. of a heptane solution of triisobutylaluminum (corresponds to 0.83 gram of which 30 weight percent is triisobutylaluminum) was added thereto. The vessel was sealed, placed in a water bath maintained at 80° C. for 3 to 5 hours. Thereafter, the vessel was removed and the contents were visually observed. Hexane or isopropanol was added to the resulting reaction product mixture which was then subjected to filtration and the residue dried. The pertinent data are set forth in Table II below.

TABLE II

| Example | Interfacial agent | Dispersion wt. percent [a] | Yield, percent | Reduced viscosity [b] | Remarks |
|---|---|---|---|---|---|
| 11 | Polyethylene [c] | ~40 | 74 | 0.6 | Poor to fair dispersion. |
| 12 | Polyisobutylene [d] | ~30 | 98 | | Poor dispersion. |
| 13 | Acrylonitrile/styrene copolymer [e] | | | | No yield. |
| 14 | Poly(2-ethylhexyl acrylate) [f] | 100 | 86 | 0.9 | Fine, white stable powder. |

[a] Wt. percent product visually observed as dispersion.
[b] Measured in benzene.
[c] Low density, high pressure polyethylene having a melt index of 3.0 measured at 190° C.
[d] Elastomeric semi-solid of approximately 15,000.
[e] 23.6 wt. percent acrylonitrile/76.4 wt. percent styrene copolymer having a reduced viscosity of 0.26 in benzene.
[f] Reduced viscosity of 0.71 in cyclohexanone.

EXAMPLE 15

To a 1.5 gallon autoclave, there were charged, by weight, 30 parts of epsilon-caprolactone, 70 parts of heptane, and 1 part of poly(vinyl stearate) having a reduced viscosity of 0.17 in toluene (added as 47 weight percent solids in heptane). The resulting mixture was heated to 80° C. and 0.15 part by weight of triisobutylaluminum (contained in a heptane solution) was added thereto. The mixture was maintained at 80° C. for 2.5 hours under a nitrogen blanket. There was recovered a fine, uniform, powdery polymeric product which had a bulk viscosity of 0.59 and a reduced viscosity of 1.30 in benzene. The yield was 97 percent.

EXAMPLE 16

In a manner similar to the procedure set forth in Example 15, when 70 stearyl methacrylate/30 vinylidene chloride copolymer [1] and delta-valerolactone monomer are used in lieu of poly(vinyl stearate) and epsilon-caprolactone, respectively, there is obtained particulate polymer of delta-valerolactone.

EXAMPLE 17

In a manner similar to the procedure set forth in Example 15, when poly(65 stearyl methacrylate-25 vinyl chloride)/eta-caprylolactone graft copolymer [2] and eta-caprylolactone monomer are used in lieu of poly(vinyl stearate) and epsilon-caprolactone, respectively, there is obtained particulate polymer of eta-caprylolactone.

EXAMPLE 18

In a manner similar to the procedure set forth in Example 15, when poly(60 lauryl methacrylate-40 vinyl chloride)/2-keto-1,4-dioxane graft copolymer [3] and 2-keto-1,4-dioxane monomer are used in lieu of poly(vinyl stearate) and epsilon-caprolactone, respectively, there is obtained particulate polymer of 2-keto-1,4-dioxane.

EXAMPLE 19

In a manner similar to the procedure set forth in Example 15, when poly(vinyl palmitate) and a mixture of 80 epsilon-caprolactone and 20 methyl-epsilon-caprolactone monomers [4] are used in lieu of poly(vinyl stearate) and epsilon-caprolactone, respectively, there is obtained particulate epsilon - caprolactone/methyl - epsilon-caprolactone polymers.

EXAMPLE 20

In a manner similar to the procedure set forth in Example 15, when 80 myristyl methacrylate/20 vinylidene chloride block copolymer and a mixture of 85 epsilon-caprolactone and 15 zeta-enantholactone monomers [5] are used in lieu of poly(vinyl stearate) and epsilon-caprolactone, respectively, there is obtained particulate epsilon-caprolactone/zeta-enantholactone polymers.

[1] Reduced viscosity of 0.2; the numerical ratio, i.e., 70/30, refers to parts by weight.
[2] Reduced viscosity of 0.4; graft copolymer comprises 40 weight percent eta-caprylolactone.
[3] Reduced viscosity of 0.3; graft copolymer comprises 30 weight percent 2–keto-1,4-dioxane.
[4] 80/20 parts by weight.
[5] 85/15 parts by weight.

What is claimed is:

1. Particulate linear polymer of cyclic esters (I) which are in a discrete, free-flowing, non-agglomerative form and which have a reduced viscosity value of at least about 0.3 and upwards to about 20;

(II) which are characterized by the recurring structural unit

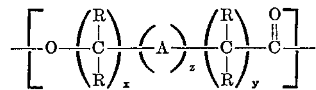

wherein each R, individually, is hydrogen, alkyl, aryl, cycloalkyl, halo, haloalkyl, alkoxyalkyl, alkoxy, or aryloxy; wherein A is an oxy group, a thio group, or a divalent saturated aliphatic hydrocarbon group; wherein $x$ is an integer from 1 to 15; wherein $y$ is an integer from 1 to 15; wherein $z$ is an integer of zero or one; with the provisos that (a) the sum of $x+y+z$ cannot equal 3, (b) the total number of atoms in the polymer chain of the above-said recurring unit does not exceed 18, (c) the total number of R variables which are substituents other than hydrogen does not exceed 4, (d) from 2 to 4 continuously linked carbon atoms which form part of the polymer chain of the above-said recurring unit can represent a portion of a saturated cycloaliphatic hydrocarbon nucleus, and (e) any four R variables attached to any two adjacent carbon atoms in the polymer chain of the above-said recurring unit can represent a portion of a fused aromatic hydrocarbon nucleus;

(III) which contain integrally associated therewith from about 0.01 to about 10 weight percent of a polymeric interfacial agent which has a reduced viscosity value of from about 0.05 to about 10; said interfacial agent being characterized (1) by a solvatable constituent (i) which is solvatable in inert, normally liquid, saturated acyclic hydrocarbons, (ii) which is essentially incompatible with said particulate linear polymers, and (iii) which has an average molecular weight up to about one million; and (2) by an anchoring constituent (i) which is non-solvatable with such inert, normally-liquid, saturated acyclic hydrocarbons, (ii) which is compatible with said particulate linear polymers such that it is associated integrally therewith, and (iii) which has an average molecular weight of at least about 1000 and is at least about 0.05 to about 10 times the total molecular weight of the solvatable constituent; wherein said interfacial agent is selected from the group consisting of:

(a) block copolymers of $C_6$–$C_{30}$ alkyl $\alpha,\beta$-alkenoate and vinyl halide, (b) graft copolymers of poly($C_6$–$C_{30}$ alkyl $\alpha,\beta$-alkenoate-vinyl halide) and the hereinabove defined cyclic esters, (c) block copolymers of $C_6$–$C_{30}$ alkyl, $\alpha,\beta$-alkenoate and vinyl alkyl ether, (d) graft copolymers of poly($C_6$–$C_{30}$ alkyl $\alpha,\beta$-alkenoate-vinyl alkyl ether) and the hereinabove defined cyclic esters, (e) block copolymers of $C_6$–$C_{30}$ alkyl $\alpha,\beta$-alkenoate and vinylidene halide, (f) graft copolymers of poly($C_6$–$C_{30}$ alkyl $\alpha,\beta$-alkenoate-vinylidene halide) and the hereinabove defined cyclic esters, and (g) graft and block copolymers of poly(alkenyl alkanoate) and the hereinabove defined cyclic esters; and (IV) which are readily dispersible in particulate form in inert normally-liquid saturated acyclic hydrocarbons.

2. The particulate linear polymers of claim 1 wherein said recurring structural unit is

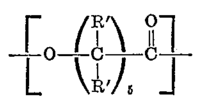

wherein each R′ is hydrogen or lower alkyl, with the proviso that no more than 3R′ variable are substituents other than hydrogen.

3. The particulate linear polymers of claim 2 wherein each R′ variable of the recurring structural unit is hydrogen.

4. The particulate linear polymers of claim 2 which form stable dispersions in inert normally-liquid saturated acyclic hydrocarbons.

5. The particular linear polymers of claim 2 wherein said recurring unit is the oxypentamethylenecarbonyl group, and wherein said interfacial agent is poly(vinyl stearate)/epsilon-caprolactone graft copolymer.

6. The particular linear polymers of claim 2 wherein said recurring unit is the oxypentamethylenecarbonyl group, and wherein said interfacial agent is lauryl methacrylate/vinyl chloride block copolymer.

7. The particular linear polymers of claim 2 wherein said recurring unit is the oxypentamethylenecarbonyl group, and wherein said interfacial agent is poly(lauryl methacrylate)/epsilon-caprolactone graft copolymer.

8. A process for producing particulate linear polymers of cyclic esters which comprises contacting and reacting (I) a cyclic ester (i) which possesses at least four atoms in the ring nucleus which contains the ester group, (ii) which possess no more than four substituents bonded to the carbon atoms of the ring nucleus, and (iii) which is free of ethylenic unsaturation and acetylenic unsaturation, with the proviso that the total number of atoms in the ring nucleus does not equal five;

(II) from about 0.01 to about 10 weight percent, based on the weight of said particulate polymers, of a polymeric interfacial agent which has a reduced viscosity value of from about 0.05 to about 10; said interfacial agent being characterized (1) by a solvatable constituent (i) which is solvatable in inert, normally-liquid, saturated, acyclic hydrocarbons, (ii) which is essentially incompatible with said particulate linear polymers, and (iii) which has an average molecular weight up to about one million, and (2) by an anchoring constituent (i) which is non-solvatable with such inert, normally-liquid, saturated, acyclic hydrocarbons, (ii) which is compatible with said particulate linear polymers such that it is associated integrally therewith, and (iii) which has an average molecular weight of at least about 1,000 and is at least about 0.05 to about 10 times the total molecular weight of the solvatable constituent; wherein said interfacial agent is selected from the group consisting of:

(a) block copolymers of $C_6$–$C_{30}$ alkyl $\alpha,\beta$-alkenoate and vinyl halide, (b) graft copolymers of poly($C_6$–$C_{30}$ alkyl $\alpha,\beta$-alkenoate vinyl halide) and the hereinabove defined cyclic esters, (c) block copolymers of $C_6$–$C_{30}$ alkyl $\alpha,\beta$-alkenoate and vinyl alkenoate and vinyl alkyl ether, (d) graft copolymers of poly($C_6$–$C_{30}$ alkyl $\alpha,\beta$-alkenoate-vinyl alkyl ether) and the hereinabove defined cyclic esters, (e) block copolymers of $C_6$–$C_{30}$ alkyl, $\alpha,\beta$-alkenoate and vinylidene halide, (f) graft copolymers of poly($C_6$–$C_{30}$ alkyl $\alpha,\beta$-alkenoate-vinylidene halide) and the hereinabove defined cyclic esters, and (g) graft and block copolymers of poly(alkenyl alkenoate) and the hereinabove defined cyclic esters;

(III) a cyclic ester polymerization catalyst:

(IV) in the presence of an inert, relatively non-polar, organic vehicle in which said cyclic ester is soluble and in which the resulting particulate polymer produced is insoluble:

(V) under essentially anhydrous conditions; and (VI) for a period of time sufficient to produce said particulate polymers.

9. The process of claim 8 wherein said cyclic ester is characterized by the formula:

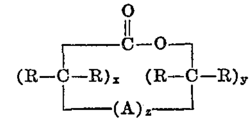

wherein each R, individually is hydrogen, alkyl, aryl, cycloalkyl, halo, haloalkyl, alkoxyalkyl, alkoxy, or aryloxy; wherein A is an oxy group, a thio group, or a divalent saturated aliphatic hydrocarbon group; wherein $x$ is an integer from 1 to 15; wherein $y$ is an integer from 1 to 15; wherein $z$ is an integer having a value of zero or one; with the provisos that (a) the sum of $x+y+z$ cannot equal 3, (b) the total number of atoms forming the cyclic ester ring does not exceed 18, (c) the total number of substituents other than hydrogen attached to the carbon atoms contained in the cyclic ester ring does not exceed 4, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variables attached to any two adjacent carbon atoms contained in the cyclic ester ring can represent a portion of a fused aromatic hydrocarbon nucleus.

10. The process of claim 9 wherein said cyclic ester is an epsilon-caprolactone.

11. The process of claim 9 wherein said cyclic ester is an alkyl-substituted epsilon-caprolactone possessing no more than three alkyl substituents.

12. The process of claim 9 wherein said cyclic ester is 2-keto-1,4-dioxane.

References Cited

UNITED STATES PATENTS

| | | | |
|---|---|---|---|
| 3,383,352 | 5/1968 | Duell et al. | 260—33.6 |
| 3,021,310 | 2/1962 | Cox et al. | 260—78.3 |

SAMUEL H. BLECH, Primary Examiner

U.S. Cl. X.R.

161—231, 254; 260—33.6 R, 33.6 UA, 77.5 D, 78.3 R, 86.3, 876 R, 876 B, 884, 885, 899, 901